United States Patent [19]

Ueno

[11] Patent Number: 5,060,083
[45] Date of Patent: Oct. 22, 1991

[54] BACKGROUND LEVEL DETECTION METHOD

[75] Inventor: Takeshi Ueno, Takarazuka, Japan

[73] Assignee: Ricoh Company, Ltd., Tokyo, Japan

[21] Appl. No.: 461,817

[22] Filed: Jan. 8, 1990

[30] Foreign Application Priority Data

Jan. 13, 1989 [JP] Japan .................................... 1-7392

[51] Int. Cl.$^5$ ............................................. H04N 1/40
[52] U.S. Cl. .................................. 358/464; 358/462; 358/467
[58] Field of Search ............... 358/464, 447, 448, 450, 358/452, 455, 456, 460, 458, 467; 382/47

[56] References Cited

U.S. PATENT DOCUMENTS 4,686,579 8/1987 Sakamoto ............................ 358/462
4,970,605 11/1990 Fogaroli et al. ..................... 358/464

Primary Examiner—Edward L. Coles, Sr.
Assistant Examiner—Jerome Gaint
Attorney, Agent, or Firm—Oblon, Spivak, McClelland, Maier & Neustadt

[57] ABSTRACT

A reference level detection system for detecting a reference level of a document comprises a background level detection circuit supplied with an input signal indicative of a background level of the document for producing a first output signal which follows a change of the background level of the document, digital feedback loop supplied with the first output signal for producing a digital data such that the digital data is changed in correspondence to the first output signal, the foregoing digital feedback loop further including a circuit for producing a second output signal from the digital data and supplied further with a command signal for prohibiting a change of the digital data at least in one direction, and a switch supplied with the command signal for selectively providing either one of the first and second output signals as the reference level such that the first output signal is provided as the reference level when the command signal is in a first state not prohibiting the change of the digital data and that the second output signal is provided as the reference level when the command signal is in a second state prohibiting the foregoing change of the digital data.

14 Claims, 3 Drawing Sheets

BACKGROUND LEVEL DETECTION METHOD

BACKGROUND OF THE INVENTION

The present invention generally relates to reading of documents for image processing and more particularly to a system and a method for detecting a background level of a document to be processed by an image processing system such as facsimile.

In a facsimile and the like, a peak-hold circuit is used for reading and storing the background level of a document to be processed. Thus, in a so-called half-tone mode used for processing a document carrying a half-tone image such as photograph and the like, the background level of the document is detected by detecting a reference level or white level of a white marginal part of a platen roller, or by detecting the white level of a white press plate or a white head part of the document. The background level thus detected is then stored in a capacitor of a peak-hold circuit.

When reading a document such as manuscript and the like which carries an image consisted of a fully black or dark colored part and a fully white or light colored part without any intermediate tone, on the other hand, a discharging circuit is combined with the peak-hold circuit so as to follow the possible change of the background level of the document by discharging the capacitor with a predetermined time constant. Such a change of the background level may occur, for example, when a photograph or other image is pasted on a part of a manuscript.

In the foregoing method in which the background level is stored in the capacitor of the peak-hold circuit, however, there is a problem in that the background level cannot be retained for a prolonged time period because of the leak current flowing through a parasitic resistance of a semiconductor device constituting the peak-hold circuit. Thus, when the transmission of image via a facsimile transmission system is interrupted for a time period of several minutes or more, for example, the background level stored in the capacitor may be changed. When this occurs, the reading of the document thereafter cannot be achieved properly and a the quality of the transmitted image is deteriorated particularly when the image thus read is processed digitally for transmission because of the false input to the digital processing system.

When reading a half-tone image such as a photograph, on the other hand, there may be a case in which a dark image continues. Further, there arises relatively often a case in which a document containing no white part has to be processed. When this occurs, a proper background detection becomes no longer possible. When the background level detection is erroneous, the reproduced document becomes whitish or darkish and in the extremest case the image thereon becomes unintelligible.

SUMMARY OF THE INVENTION

Accordingly, it is a general object of the present invention to provide a novel and useful background detection system and method wherein the foregoing problems are eliminated.

Another object of the present invention is to provide a background detection system and method wherein a proper background detection is made even when a transmission of document is interrupted for a prolonged time period or even when a document carrying a half-tone image such as photograph is transmitted for a long time period.

Another object of the present invention is to provide a background level detection system of a document reading apparatus for detecting a background level of a document, wherein an output of a peak-hold circuit used for background detection of the document is monitored by a digital feedback loop, and the peak-hold circuit and the digital feedback loop are selectively used as the means for producing a background level signal such that the output signal of the peak-hold circuit is used as the background level signal when reading a first type document carrying no half-tone and such that an output signal of the digital feedback loop is used as the background level signal when a second type document carrying a half-tone image is read or when a document is read after a prolonged interruption. According to the present invention, the peak-hold circuit and the digital feedback loop are selectively switched depending on the type of the document to be read. By selecting the peak-hold circuit, one can monitor the background level of the first type document continuously while by selecting the digital feedback loop, one can use the background level detected previously when the first type document is read last time as the background level for the second type document. Note that the background level previously detected is held stably in the up/down counter of the digital feedback loop in a form of digital count and does not decay even a long time has elapsed.

Another object of the present invention is to provide a background level detection system of a document reading apparatus for detecting a background level of a document, comprising a peak-hold circuit, a digital-to-analog converter supplied with a digital data for producing an analog output signal, a window comparator for comparing an output of the peak-hold circuit and the analog output of the digital-to-analog converter, and an up/down counter for producing the digital data to be supplied to the digital-to-analog converter responsive to the result of comparison in the window comparator, wherein the up/down counter is controlled by its own output state such that the counter holds its state against a count-up signal when the count is maximum and such that the counter assumes either an up-state or hold state except for a case in which the state of the counter is maximum. According to the present invention, a reference background level obtained by reading a first type document carrying no half-tone image is held stably in the up/down counter in a form of digital data and yet, the reference background level can be updated when a second type document carrying a half-tone image read after the previous background level detection, has a background level higher than that of the previously read document. Such a situation occurs when the first type document read prior to the second type document was printed on a colored sheet or when a white reference part of the document reading apparatus is contaminated or stained. Further, when the background level stored in the up/down counter has exceeded its maximum count, the count is fixed at such a maximum count and the problem such as inversion of black and white because of the counter returning to zero passing the maximum is positively prevented. Thereby an intelligible image is guaranteed.

Other objects and further features of the present invention will become apparent from the following detailed description when read in conjunction with attached drawings.

DETAILED DESCRIPTION

Figure 1:
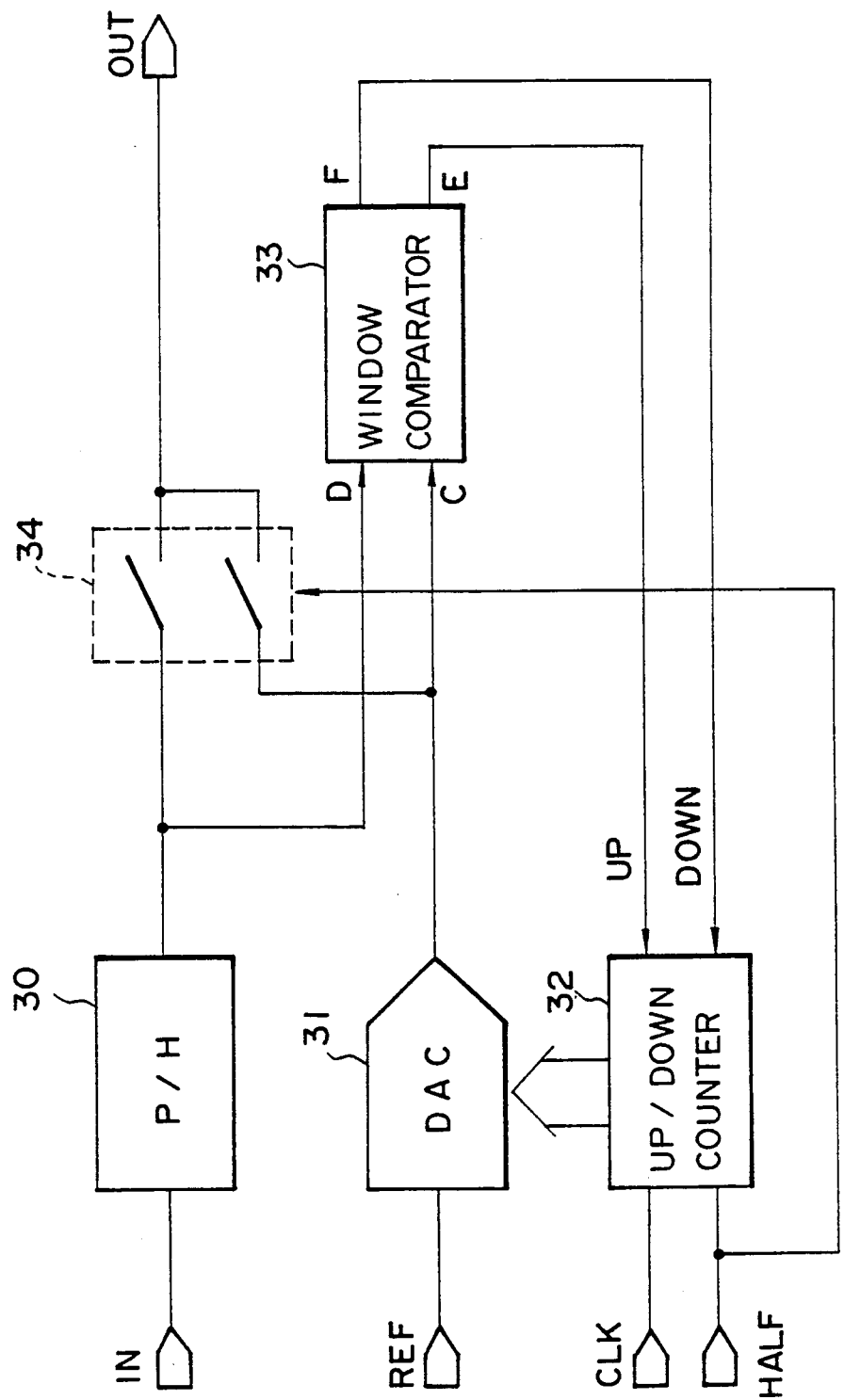
FIG. 1 is a block diagram showing an embodiment of the background level detection system according to the present invention.

FIG. 1 shows a background level detection system according to an embodiment of the present invention. Referring to the drawing, the system comprises a peak-hold circuit 30 for detecting a background level of a document, a digital-to-analog converter 31 supplied with a predetermined reference voltage REF for producing an output signal with reference to the voltage REF by analog-to-digital conversion of a digital data supplied thereto, a window comparator 33 for comparing an output signal of the peak-hold circuit 30 which is supplied as an input signal D and the output signal of the digital-to-analog converter 31 which is supplied thereto as an input signal C for producing a first output signal E and a second output signal F to be described as a result of comparison, an up/down counter 32 supplied with the foregoing first output signal E and the second output signal F and further with a usual clock CLK for supplying a digital count to the digital-to-analog converter 31 as the digital data which is increased or decreased responsive to the combination of state of the signals E and F. The up/down counter 32 is further supplied with a half-tone mode command signal HALF and is controlled such that when the command signal HALF is low indicating that the document to be processed is a first type document referred to hereinafter a "binary mode document" carrying no half-tone image, the increase or decrease of the count is allowed. When the command signal HALF is high indicating that the document to be processed is a second type document referred to hereinafter a "half-tone mode document" carrying a half-tone image, on the other hand, the change of the count is prohibited even when the signals E and F are supplied. In this state, the up/down counter 32 is stopped and the count is retained. This digital count is supplied to the digital-to-analog converter 31 as the digital data as already described and the digital-to-analog converter 31 performs the digital-to-analog conversion as described whereby the foregoing output signal or the signal C is obtained.

Next the peak-hold circuit 30 used in the system of FIG. 1 will be described in detail in reference to FIG. 2. Note that the circuit 30 itself is known.

Figure 2:
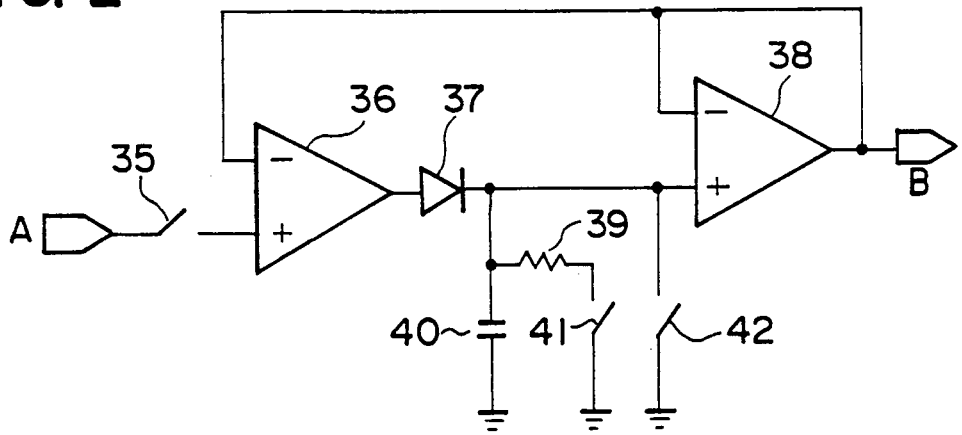
FIG. 2 is a circuit diagram showing a peak-hold circuit used in the system of FIG. 1.

Referring to FIG. 2, the input background level signal which may be produced by a photo sensor such as a CCD device (not shown) and amplified by a known amplifier circuit (not shown) is supplied to a non-inverting input terminal of a comparator 36 through an input terminal A and a sampling switch 35. The comparator 36 has an output terminal connected to a non-inverting input terminal of a buffer amplifier 38 via a rectifier diode 37. Further, a memory capacitor 40 is connected between the non-inverting input terminal of the buffer amplifier 38 and the ground, and a serial connection circuit comprising a resistor 39 and a discharge switch 41 is connected in parallel to the capacitor 40. Further, a reset switch 42 is connected to the non-inverting input terminal of the buffer amplifier 38 so as to short-circuit the capacitor 40 when closed. This buffer amplifier 38 further has an output terminal which is on the one hand connected to an output terminal B of the peak-hold circuit 36 and further to an inverting input terminal of the comparator 36 as well as to an inverting input terminal of the amplifier 38.

Next, the operation of the peak-hold circuit 30 will be described with reference to a following TABLE I.

TABLE I

| MODE | I | II | III | IV |
|---|---|---|---|---|
| SW35 | ON | OFF | OFF | OFF |
| SW41 | x | OFF | ON | x |
| SW42 | OFF | OFF | OFF | ON |

When monitoring the background level of a document in correspondence to a mode I of TABLE I, the sampling switch 35 is closed while the reset switch 42 is opened. The discharge switch 41 may be closed or may not be closed as represented by a symbol x. Thus, whenever a background level signal having a level which is larger than the previous background level is supplied, such a newly supplied background level signal is stored in the capacitor 40 and the capacitor 40 stores the peak level of the background level signal. When the switch 41 is opened, the highest peak level ever detected since the last resetting is stored in the capacitor provided that there is no leak current flowing through the capacitor 40. When the switch 41 is closed, on the other hand, the capacitor is discharged with a predetermined time constant while at the same time charged by the newly incoming background level signal, and the white background level stored in the capacitor 40 is changed responsive to the actual change of the background level of the document. In other words, the peak-hold circuit 30 follows the change of the background level of the document.

When the switches 35, 41 and 42 are all opened in correspondence to a mode II of TABLE I, the electrical charge stored in the capacitor 40 is, in the ideal case, retained and the output signal at the output terminal B is fixed at the background level which is detected at the moment the switches are opened. This mode has been conventionally used for providing the background level when reading a half-tone mode document. In this case, a previously read background level of a binary mode document is used as the background level of the half-tone mode document which has no reference white part. As already described with reference to the prior art, however, the actual circuit allows a finite leak current flowing through the capacitor 40 and the background level cannot be retained when the duration of this mode is continued for more than several minutes or when the facsimile transmission is interrupted for a long time.

When the sampling switch 35 and the reset switch 42 are opened while the discharge switch 41 is closed in correspondence to a mode III of TABLE I, there is no charging of the capacitor 40 and the capacitor is discharged with a predetermined time constant. Further, when the reset switch 42 is closed and the sampling switch 35 is opened as in a mode IV of TABLE I, the capacitor 40 is quickly discharged. The mode III and the mode IV are used for resetting the circuit 30.

Next, the window comparator 33 used in the system of FIG. 1 will be described in detail with reference to FIG. 3.

Referring to the drawing, the window comparator 33 comprises an input terminal C' for receiving the input signal C having a voltage Vdac from the digital-to-analog converter 31, another input terminal D' for receiving the input signal D having a voltage Vph from the peak-hold circuit 30 and a comparator 47 supplied with the input signal C from the input terminal C' at an inverting input terminal thereof via a resistor 44 and further supplied with the input signal D from the input terminal D' at its non-inverting input terminal. Further, there is provided another comparator 48 which is supplied with the input signal C from the input terminal C' at its inverting input terminal via a resistor 45 and further supplied with the input signal D from the input terminal D' at its non-inverting input terminal similarly to the comparator 47. Note that the resistor 44 and the resistor 45 are connected in series whereby the input terminal C' is connected to a node between the resistor 44 and the resistor 45. Further, a constant current source 43 for supplying a constant current I is connected to a node between the resistor 44 and the inverting input terminal of the comparator 47 in series to the resistors 44 and 45, and another constant current source 46 for passing the constant current I is connected to a node between the resistor 45 and the inverting input terminal of the comparator 48 in series to the constant current source 43, resistor 44 and the resistor 45. Output signals of the comparators 47 and 48 are respectively supplied to an AND gate 49 which produces the foregoing output signal E at an output terminal E'. Further, the outputs of the comparators 47 and 48 are supplied also to a NOR gate 50 which produces the foregoing output signal F at another output terminal F'.

Figure 3:
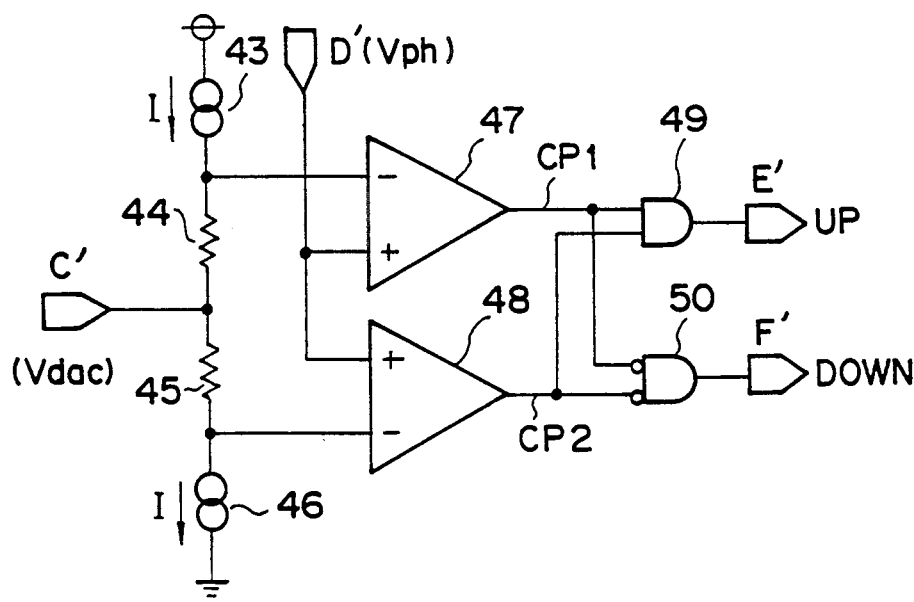
FIG. 3 is a circuit diagram showing a window comparator used in the system of FIG. 1.

In the circuit of FIG. 3, note that the voltage applied to the inverting input terminal of the comparator 47 is represented as Vdac+IR where R is the resistance of the resistor 44 and the term IR represents the voltage drop established across the resistor 44. This voltage Vdac+IR acts as the higher threshold voltage of the window comparator 33. Similarly, the voltage applied to the inverting input terminal of the comparator 47 as the lower threshold voltage assumes a level Vdac−IR where the term IR represents the voltage drop established across the resistor 45. Note that the resistor 45 also has the resistance R.

Figure 4:
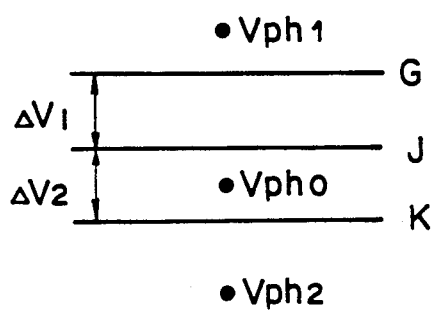
FIG. 4 is a diagram for explanation of the window comparator of FIG. 3.

Thus, a window margin having a width of ±IR is obtained according to the circuit construction of FIG. 3. FIG. 4 shows such a window margin. Referring to FIG. 4, the upper threshold level represented by a level G is defined above a central level J and the lower threshold level represented by a level K is defined below the central level J such that the level G is higher than the level J by a voltage difference $\Delta V_1$ and the level K is lower than the level J by a voltage difference $\Delta V_2$. Note that the voltage differences $\Delta V_1$ and $\Delta V_2$ correspond to the voltage drop IR established across the resistors 44 and 45.

Thus, when the input signal D from the peak-hold circuit 30 has a level $Vph_0$ which is inside the window margin as shown in FIG. 4, both of the output signals E and F produced by the AND gate 49 and the NOR gate 50 assume the low level state and the count in the up/down counter 32 is not changed. When the input signal D has a level $Vph_1$ which is above the upper threshold level G of the window margin, on the other hand, the output signal E produced by the AND gate 49 assumes a high level state and the count in the up/down counter 32 is increased. The output signal F produced by the NOR gate 50 assumes the low level state. Further, when the input signal D has a level $Vph_2$ which is below the lower threshold level K, the output signal F assumes the high level state while the output signal E assumes the low level state. Responsive thereto, the count in the up/down counter 32 is decreased. The following TABLE II summarizes the foregoing operation of the window comparator 33.

TABLE II

| MODE | COMP 47 | COMP 48 | E | F | UP/DOWN |
|---|---|---|---|---|---|
| I | H | H | H | H | UP |
| II | L | H | L | L | — |
| III | L | L | L | H | DOWN |

As already described, the up/down counter 32 is clocked by the clock CLK and the up/down change of the count is stopped when the command signal HALF is supplied. When this occurs, the count at the moment the command is given is retained.

Next, the operation of the system of FIG. 1 will be described.

When transmitting a binary mode document by facsimile for example, the reset switch 42 is once closed and then opened. Thereby, the reset of the peak-hold circuit 30 is made by discharging the capacitor 40. Next, the sampling switch 35 and the discharge switch 41 are closed and the reading of the document is started. Thus, the reference white part on the platen roller or white press plate or the head part of the document is read for detection of the background level and the background level signal is stored in the capacitor 40. The capacitor 40 is discharged with a predetermined time constant and at the same time charged by the output signal of the peak-hold circuit 30 as already described. Thus, the peak-hold circuit 30 monitors the background level of the document continuously or the charge stored in the capacitor 40 is changed according to the change of the background level of the document. In this state, the command signal HALF is not supplied or supplied with a low level state and responsive thereto, the selector switch 34 selects the peak-hold circuit 30. In other words, the output of the peak-hold circuit 30 is supplied to the output terminal OUT as the background level signal. The command signal HALF may be given manually by a user.

The output signal of the peak-hold circuit 30 is at the same time compared with the output signal of the digital-to-analog converter 31 in the window comparator as already described and the up/down counter 32 is controlled responsive to the result of the comparison such that the digital count in the up/down counter 32 is increased when the signal D exceeds the signal C by an amount exceeding the window margin as in the case of FIG. 4 represented by the point $Vph_1$ (MODE I of TABLE II), or such that the digital count in the up/down counter 32 is decreased when the signal D is less than the signal C as in the case of FIG. 4 represented by the point $Vph_2$ (MODE III of TABLE II). Responsive thereto, the output voltage of the digital-to-analog converter 31 or the voltage C is increased or decreased respectively and by repeating the foregoing processes, the signal C from the digital-to-analog converter 31 is changed repeatedly until the difference between the signal D and the signal C falls in the window margin as illustrated in FIG. 4 by the point Vph0 (MODE II of TABLE II). When this state is reached, the up/down counter 31 becomes stationary. According to the us of the foregoing digital loop comprising the digital-to-analog converter 31, window comparator 33 and the up/down counter 32, the signal C or the output signal of the digital-to-analog converter 31 is changed so as to follow the actual background level detected by the peak-hold circuit 30.

When transmitting a half-tone mode document carrying a half-tone image, the user provides the half-tone mode command signal HALF to the up/down counter 32 as well as to the selector switch 34. When this command is given, the up/down counter 32 stops and holds the count. Further, the switch 34 is actuated such that the output signal of the digital-to-analog converter 31 is supplied to the output terminal OUT as the background level signal instead of the output signal of the peak-hold circuit 30. As the output of the digital-to-analog converter 31 has been continuously changed to follow the background level of the previously transmitted binary lo mode document, such a switching to replace the background level by the output signal of the digital-to-analog converter 31 does provide a suitable substitute of the background level and the transmission of the half-tone mode document is performed without problem. As a result, the half-tone mode document such as photograph carrying no reference white part can be transmitted by using the background level which was detected by the previous transmission of the binary mode document as the background level. As the background level is stored in a form of the digital count in the up/down counter, there is no possibility of change of the background level and thus, the variation of the background level after sending the half-tone mode document for a long time or after interrupting the transmission of the document for a prolonged time period is positively eliminated. The latter feature is also effective in realizing a stable facsimile transmission of a binary mode document.

In the foregoing system where the background level used for reading a half-tone mode document is fixed at the background level detected by the previous reading of the binary mode document, there can be a case that a level exceeding the background level is encountered during the reading of the half-tone mode document. Such a situation occurs when the white reference part of the document reading apparatus is stained or when the binary mode document read previous to the reading of the half-tone mode document was printed on a dark-colored sheet. In such a case, it is necessary to increase the count of the up/down counter instead of fixing it in order to avoid the reproduced document becoming whitish after facsimile transmission or the like. Such an updated count should be held until a new background level exceeding the previous one is detected.

Further, when a shading correction is applied in which a correction data is produced by detecting the white level of the platen roller or white press plate or by reading the head part of the document, there can be a case where the actual white level of the document exceeds the maximum output level of the digital-to-analog converter 31 if the white reference part used for detecting the background level is stained or contaminated.

In order to avoid the foregoing undesirable situation, it is desired to modify the system of FIG. 1 such that the count in the up/down counter 32 is updated in a direction to increase the count when a background level signal having a level exceeding that of the previous one is entered to the system and such that the count in the up/down counter 32 is held when the maximum count of the counter 32 is reached. The latter feature is needed in order to avoid the inversion of black and white responsive to the large input of the background level signal which in turn causes the increase of the count in the up/down counter 32 beyond its maximum count. In such a case the count of the up/down counter 32 is returned to zero after passing the maximum.

Figure 5:
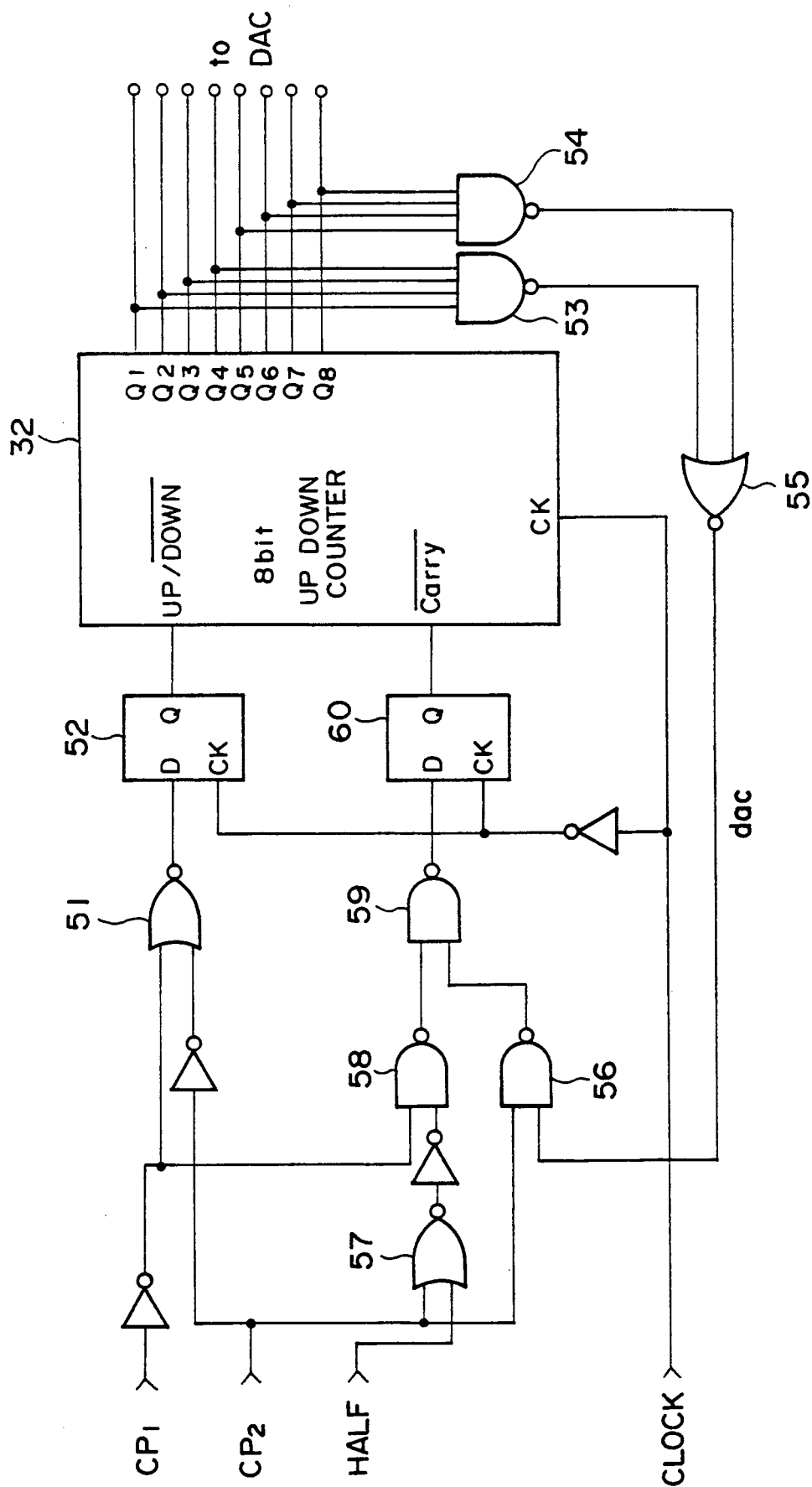
FIG. 5 is a circuit diagram showing a control circuit of an up/down counter according to a second embodiment of the present invention.

FIG. 5 shows an embodiment of a control circuit of the up/down counter 32 used for the foregoing purpose. Referring to FIG. 5, a signal CP1 produced by the foregoing comparator 47 and a signal CP2 produced by the the comparator 48 of the window comparator 33 (see FIG. 3) are supplied to a NOR gate 51 through respective inverters. An output of the NOR gate 51 in turn is supplied to a D-type flip-flop 52. Further, an output of the flip-flop 52 is supplied to an up/down input terminal of the up/down counter 32. In the illustrated example, an eight bit up/down counter producing an eight bit data is used.

In order to detect the maximum count of the up/down counter 32, the output data of the up/down counter 32, which is supplied to the digital-to-analog converter 31 as already described, is further supplied to a NAND gate 53 and another NAND gate 54 wherein the lower four bits of the output data ar supplied to the NAND gate 53 and the upper four bits are supplied to the NAND gate 54. Outputs of the NAND gate 53 and the NAND gate 54 are supplied to a NOR gate 55 and the NOR gate 55 supplies its output DAC to one of input terminals of a NAND gate 56. The output DAC indicates if the count in the up/down counter is maximum or not. The NAND gate 56 further receives the signal CP2 at its another input terminal.

The half-tone mode command signal HALF is in this embodiment supplied to a NOR gate 57 together with the signal CP2. The NOR gate 57 supplies an output to one of input terminals of a NAND gate 58 via an inverter and the NAND gate 58 receives the signal CP1 at another input terminal. Further, an output of the NAND gate 56 and an output of the NAND gate 58 are supplied to another NAND gate 59 of which output is supplied to a D-type flip-flop 60. Further, an output of the flip-flop 60 is supplied to a carry input terminal of the up/down counter 32. When the signal applied to the carry input terminal is zero or low, the counter 32 increases or decreases the count responsive to the signal at the up/down input terminal. When the signal at the carry input terminal is one or high, on the other hand, the counter holds its count. Note that the command signal HALF assumes the high level state when a half-tone mode document is to be read and the low level state when a binary mode document is to be read. The flip-flop 52 and the flip-flop 60 are clocked by the clock CLK similarly to the up/down counter 32.

The following TABLE III summarizes the operation of the circuit of FIG. 5.

TABLE III

| CASE | HALF | CP1 | CP2 | DAC | MODE |
|------|------|-----|-----|-----|------|
| I | 0 | 1 | 1 | 0 | UP |
|   | 0 | 1 | 1 | 1 | HOLD |

TABLE III-continued

| CASE | HALF | CP1 | CP2 | DAC | MODE |
|---|---|---|---|---|---|
| II | 0 | 0 | 1 | 0 | HOLD |
|  | 0 | 0 | 1 | 1 | HOLD |
| III | 0 | 0 | 0 | 0 | DOWN |
|  | 0 | 0 | 0 | 1 | DOWN |
| IV | 1 | 1 | 1 | 0 | UP |
|  | 1 | 1 | 1 | 1 | HOLD |
| V | 1 | 0 | 1 | 0 | HOLD |
|  | 1 | 0 | 1 | 1 | HOLD |
| VI | 1 | 0 | 0 | 0 | HOLD |
|  | 1 | 0 | 0 | 1 | HOLD |

Referring to the foregoing TABLE III, in the case I where the command signal HALF is low and the signals CP1 and CP2 are both high, the output of the NOR gate 51 becomes high and the flip-flop 52 supplies the high level signal to the up/down input terminal of the up/down counter 32. Further, the NOR gate 57 produces a low level output and the NAND gate 58, being supplied with the low level signal from the inverter to which the signal CP1 is applied, produces a high level output responsive thereto.

When the count of the counter 32 is not full, the NAND gates 53 and 54 produce a high level output or a combination of high level output and a low level output and responsive thereto the NOR gate 55 produces a low level DAC output. Thus, the NAND gate 56 is supplied with the low level output from the NOR gate 55 on the one hand and further with the high level signal CP2 on the other hand, and produces a high level output signal. Thus, the NAND gate 59, being supplied with the high level output from the NAND gate 56 and further with the high level output from the NAND gate 59, produces a low level output which is supplied to the D terminal of the flip-flop 60. The flip-flop 60 then supplies a low level output to the carry input terminal of the up/down counter and the count in the up/down counter is increased. This state corresponds to the mode "UP" of the case I in TABLE III.

When the the count in the up/down counter 32 is full, on the other hand, the outputs of the AND gates 53 and 54 become both low and the NOR gate 55 produces a high DAC output. This high DAC output is supplied to the NAND gate 56 and the gate 56, being supplied with the high level CP2 signal, produces a low level output. Responsive thereto, the NAND gate 59 produces a high level output which is applied to the carry input terminal of the up/down converter 32 by the flip-flop 60. Thereby, the up/down counter 32 is stopped and the count in the counter 32 is retained. This corresponds to the mode "HOLD" of the case I in TABLE III.

In the case II where the command HALF is low and the signal CP1 low, the signal CP2 high, the NOR gate 51 supplies a low level output to the flip-flop 52 and a low level signal is applied to the up/down input terminal of the up/down counter 32. When the counter 32 is not full, the NAND gates 53 and 54 produce a high level output or a combination of high level output and a low level output similarly to the foregoing case and the NOR gate 55 produces a low DAC signal which is supplied to the NAND gate 56. The NAND gate 56 is further supplied with the high level CP2 signal and produces a high level output. The NOR gate 57, on the other hand, is supplied with the low level command signal HALF and the high level signal CP2, and produces a low level output which is inverted to the high level and supplied to the NAND gate 58. Futhermore, the NAND gate 58 is supplied with a high level signal as a result of inversion of the low level signal CP1 and thus produces a low level signal. Thus, the NAND gate 59 is supplied with the low level signal from the NAND gate 58 and the high level signal from the NAND gate 56 whereby a high level output signal is produced and supplied to the D terminal of the flip-flop 60. As a result, a high level signal is applied to the carry input terminal of the up/down counter 32 and the operation of the counter is stopped in correspondence to the mode "HOLD" of the case II.

When the count in the counter 32 is full in the case II, the NAND gates 53 and 54 both produce the low level outputs and responsive thereto, the DAC signal produced by the NOR gate 55 assumes the high level state. In this case the NAND gate 56 produces a low level output and the NAND gate 59 produces a high level output. Thus, the signal applied to the carry input terminal of the up/down counter 32 is set high and the counting operation of the counter is stopped or prohibited. This corresponds to another "HOLD" mode of the case II in TABLE III.

In a case III where the command HALF is low and the signal CP1 low, the signal CP2 low, the NOR gate 51 produces a low output which is applied to the up/down input terminal of the up/down counter 32. On the other hand, the NOR gate 57 produces a high level output and the NAND gate 58 produces a high level output. When the count in the counter 32 is not full, the DAC output is low as already described and the NAND gate 56 produces a high level output. Thus, the NAND gate 59 produces a low level output which is supplied to the carry terminal of the up/down counter 32 after passing through the D-type flip-flop 60. As the signal applied to the carry input terminal is low, the counting up and down operation of the counter 32 is not prohibited, and as a low level signal is applied to the up/down input terminal, the counter 32 decreases its count with the clock CLK in correspondence to the made "DOWN" of the case III.

When the count in the up/down counter 32 is full, on the other hand, the DAC output from the NOR gate 55 becomes high. In this case, the NAND gate 56 produces a high level output similarly to the case where the counter 32 is not full. Thus, the operation of the circuit is identical and the up/down counter 32 reduces its count in correspondence to another DOWN mode of the case III shown in TABLE III.

The description so far is for the case where the command signal HALF is low indicating that the document to be read is a binary mode document. As will be clearly understood from the foregoing description, the count in the up/down counter 32 is increased, decreased or held responsive to the signals CP1 and CP2 indicating the deviation of the detected background level with respect to the window margin of the window comparator 33. In other words, the counter 32 follows the change of the background level of the document.

Hereinafter, the cases IV through VI will be described where the command signal HALF is high indicating that the document to be read is a half-tone mode document.

In the case IV where the command signal HAL is high and further the signals CP1 and CP2 are both high, the up/down input terminal of the up/down counter 32 is applied with the high level input similarly to the foregoing case I. Further, the NOR gate 57 supplied with the command signal HALF now having the high level and further with the high level signal CP2 produces a low level output and the NAND gate 58 produces a high level output responsive thereto. When the up/down counter 32 is not full, the DAC output of the NOR gate 55 is low similarly to the foregoing cases and the NAND gate 56 produces a high level output. Thus, the NAND gate 59 supplied with the high level output from the NAND gate 58 and further supplied with the high level output from the NAND gate 56, produces a low level output which is, after delayed in the D-type flip-flop 60, applied to the carry input terminal of the up/down counter 32. As the level of the input applied to the carry input terminal is low, the up/down counter 32 is allowed to change its count, and as the high level signal is applied to the up/down input terminal, the count in the up/down counter 32 is increased. This mode is represented in TABLE III as the mode "UP" of the case IV. When the count in the up/down counter 32 is full in the case IV, the DAC signal assumes the high level state. Thus, the output of the NAND gate 56 changes to low and the NAND gate 59 produces a high level output which is applied to the carry input terminal of the up/down counter 32. As a result, the counting-up or counting-down of the up/down counter 32 is prohibited and the count is held in correspondence to the mode "DOWN" of the case IV.

In the case V where the command signal HALF is high, the signal CP1 is low and the signal CP2 is high, the NOR gate produces a low level output which is supplied to the up/down terminal of the up/down counter 32 through the D-type flip-flop 52. Further, the NOR gate 57 produces a low level output and the NAND gate 58 produces a low level output. When the up/down counter 32 is not full, the DAC output is low whereby the NAND gate 56 produces a high level output. Thus, the NAND gate 59 produces a high level output which is supplied to the carry terminal of the up/down counter 60 via the flip-flop 60. Thereby, the operation of the counter is stopped. This corresponds to the "HOLD" mode of the case V. When the command signal HALF is low in the case V, the output of the NAND gate 56 is changed to low responsive to the low level DAC signal, and the NAND gate 59 produces a high level output also in this case. Thus a high level signal is applied to the carry terminal of the up/down counter 32 and the counting-up or counting-down operation thereof is prohibited in correspondence to another "HOLD" mode of the case V.

Further, in the case VI where the command signal HALF is high and the signals CP1 and CP2 are both high, the NOR gate 51 produces a low level signal and this low level signal is applied to he up/down terminal of the up/down counter 32 after delayed by the D-type flip-flop 52. Further, the NOR gate 57 produces a high level output and the NAND gate 58 produces a low level output. When the count of the up/down counter 32 is not full the DAC output of the NOR gate 55 assumes the low level state and thus the NAND gate 56 produces a high level output. Responsive thereto, the NAND gate 59 produces a high level output which is supplied to the carry terminal of the up/down counter 32 via the D-type flip-flop 60 similarly to the foregoing case, whereby the counting-up and counting-down operation of the counter 32 is prohibited irrespective of the state of the up/down input terminal in correspondence to the "HOLD" mode of the case VI. When the count of the up/down counter is full, the DAC output assumes the high level state. In this case, too, the NAND gate 56 produces a high level output and the counting-up or counting-down of the up/down counter 32 is prohibited in correspondence to the another "HOLD" mode of the case VI.

From the foregoing description, it will be understood that the digital count of the up/down counter is decreased when the half-tone mode command signal HALF is high and when the comparator 47 and the comparator 48 both produce high level outputs CP1 and CP2. This corresponds to a case where a half-tone mode document having a white level exceeding the white level of the previous binary mode document is read in the half-tone mode, and when this occurs, the background level stored in the up/down counter 32 in the form of the digital count is updated in a direction to increase the background level. Thus, the problem such as the reproduced document becomes whitish is avoided. As already described, such a situation occurs when the binary mode document previously read or the white reference part of the document reading apparatus previously used in the binary mode is stained, or when the binary mode document previously read was printed on a dark-colored sheet. Note that the count of the up/down counter is either increased or held in the half-tone mode and never decreased. Thus, the problem of unwanted change of the count corresponding to the unwanted decrease of the background level by the leak of the electric charge stored in the capacitor a in the prior art background detection system does not occur in the present system. Thus, the present system can handle the reading of document even even when the reading or transmission of the document is interrupted for a long time period or a dark-tone photograph and the like is read continuously for a long time period. By again reading another binary mode document, the background level stored in the up/down counter 32 is adjusted to the actual background level by the foregoing digital feedback loop.

Further, the present invention is not limited to these embodiments but various variations and modifications may be made without departing form the scope of the invention.

What is claimed is:

1. A method of detecting a reference level of a document for reading, comprising the steps of:

detecting variations of a background level of the document during a scan thereof to produce a variable background level signal indicative of at least a peak value of the background level;

producing digital data such that the digital data is changed in correspondence to variations of said variable background level signal;

selecting said variable background level signal as a reference signal used as a reference level for reading the document when the document is a first type document which is free from a half-tone image;

selecting the digital data as the reference signal when reading a second type document which carries a half-tone image; and controlling the digital data, when reading the second type document, such that said digital data is updated only when the peak value of the detected background level exceeds a predetermined threshold, said updating of the digital data being prohibited in a direction decreasing a value of the digital data;

wherein said steps of selecting said variable background level signal and the digital data as the reference signal are achieved selectively in response to a command signal the respectively specifies one of the background level signal and the digital data as the reference signal.

2. A method as claimed in claim 1 in which said step of detecting the background level comprises a step of storing the detected background level in a capacitor, a step of discharging the capacitor with a predetermined time constant and a step of producing the background level signal responsive to an electric charge stored in the capacitor.

3. A method as claimed in claim 1 in which said step of producing the digital data comprises steps of converting the digital data to an analog data, comparing the analog data with said background level signal, and changing the digital data such that a difference between the analog data and the background level signal falls in a predetermined range.

4. A reference level detection system for detecting a reference level of a document used for reading the document, comprising:
background level detection means supplied with an input signal indicative of a background level of the document for producing a first output signal which follows a time-dependent change of the background level of the document;
digital feedback loop means supplied with said first output signal for producing a digital data such that the digital data is changed in correspondence to the first output signal, said digital feedback loop means further comprising means for producing a second output signal from the digital data, said digital feedback loop means being further supplied with a command signal and prohibiting a change of the digital data at least in one direction responsive to the command signal; and
switching means supplied with the first and second output signals and further with the command signal for selectively providing either one of the first and second output signals as the reference level such that the first output signal is provided as the reference level when the command signal is in a first state not prohibiting the change of the digital data and that the second output signal is provided as the reference level when the command signal is in a second state prohibiting said change of the digital data.

5. A system as claimed in claim 4 in which said background level detection means comprises an analog peak-hold circuit comprising a memory capacitor, said peak hold circuit storing a peak level of the input signal in a capacitor as an electric charge and producing the first output signal responsive to a voltage established across the capacitor, said peak-hold circuit further comprising a discharging circuit connected across the capacitor for discharging the electric charge with a predetermined time constant.

6. A system as claimed in claim 5 in which said peak-hold circuit comprises a first comparator having a non-inverting input terminal to which said input signal is applied and an output terminal to which said capacitor is connected, and a second comparator having a non-inverting input terminal to which the output terminal of said first comparator is connected and producing the first output signal at its output terminal responsive to the voltage established across the capacitor, said peak-hold circuit further having a feedback loop for feeding back the first output signal to an inverting input terminal of the first comparator and further to an lo inverting input terminal of the second comparator.

7. A system as claimed in claim 5 in which said discharging circuit connected across the capacitor comprises a resistor and a switch corrected in series thereto and said peak hold circuit further comprises a reset switch provided so as to short-circuit the capacitor.

8. A system as claimed in claim 4 in which said digital feedback loop means comprises a window comparator supplied with said first and second output signals for producing a control signal as a result of comparison such that said control signal assumes a first state when a difference between said first and second output signals exceeds a predetermined window margin, a second state when the difference falls within said predetermined window margin, and a third state when the difference is decreased below said predetermined window margin, a feedback path for supplying the second output signal to said window comparator, and up/down count means supplied with the control signal for producing said digital data responsive to the control signal, said up/down count means further supplied with said command signal and prohibiting the change of the digital data at last in said one direction responsive to the command signal, and said means for producing the second output comprises a digital-to-analog converter supplied with the digital data for producing the second output signal by a digital-to-analog conversion of said digital data.

9. A system as claimed in claim 8 in which said window comparator comprises a first comparator for comparing a difference between a level of the first output signal and that of the second output signal with a first threshold level so as to produce a first comparison signal and a second comparator for comparing said difference with a second threshold level lower than the first threshold level so as to produce a second comparison signal.

10. A system as claimed in claim 9 in which said first comparator has a non-inverting input terminal to which said first output signal is applied, said second comparator having a non-inverting input terminal to which said second output signal is applied, said first and second comparators having respective inverting input terminals connected at one end and at the other end of a voltage divider respectively, and said voltage divider is connected in series with a constant current source and supplied with said second output at an intermediate node thereof.

11. A system as claimed in claim 9 further comprising a logic means supplied with said first and second comparison signals for producing a third and fourth comparison signals to be supplied to the up/down count means as the control signal.

12. A system as claimed in claim 8 in Which said up/down count means prohibits the change of the digital data in either directions responsive to the command signal.

13. A system as claimed in claim 8 in which said up/down count means further comprises an up/down counter and a counter controller for controlling the up/down counter, said counter controller comprising count detection means supplied with said digital data for discriminating if the digital data is equal to a maximum count of the up/down counter or not and producing a counter state signal indicating if the the up/down counter is full or not, and counter control means supplied with said command signal, said control signal, and said count state signal for controlling the up/down counter such that the digital data is changed in both directions responsive to the control signal when the command signal is in said first state while prohibiting the change of the digital data when the command signal is in said second state except for a case when said counter state signal indicates that the up/down counter is not full and at the same time when said control signal has a state indicating that the first output signal has exceeded the second output signal beyond said predetermined window margin.

14. A system as claimed in claim 13 in which said counter control means further prohibits the change of the digital data when the command signal is in the first state and simultaneously when the control signal has a state indicating that the first output signal ha exceeded the second output signal beyond said predetermined window margin and further simultaneously when the counter state signal indicates that the up/down counter is full.

* * * * *